United States Patent

[11] 3,628,967

[72] Inventor  Norbert Francis Toussaint
               Skokie, Ill.
[21] Appl. No. 839,336
[22] Filed     July 7, 1969
[45] Patented  Dec. 21, 1971
[73] Assignee  Florasynth, Inc.

[54] TWO-STAGE SOLVENT DRYING OF FOODS
     8 Claims, 2 Drawing Figs.
[52] U.S. Cl...................................... 99/103,
         99/204, 99/199, 99/208, 134/12
[51] Int. Cl....................................... A23l 1/00,
                                                  A23b 7/02
[50] Field of Search............................. 99/199,
         201–204, 208, 209, 7, 154, 71, 100, 103; 34/5, 9;
         202/42; 203/12, 68, 70, 67; 252/1, 254

[56]            References Cited
                UNITED STATES PATENTS
    125,247    1872    Adamson et al. ............   99/204

| 2,152,716 | 4/1939  | Van Wirt et al. ........... | 203/12   |
| 2,285,093 | 6/1942  | Kokatnur ................... | 252/1    |
| 2,374,455 | 4/1945  | Porsche et al. ............. | 99/199   |
| 2,454,941 | 11/1948 | Pierce et al. ............... | 203/12 X |
| 2,477,303 | 7/1949  | Lake et al. .................. | 202/42   |
| 2,619,425 | 11/1952 | Levin ......................... | 99/208   |
| 3,298,109 | 1/1967  | Bohrer ........................ | 99/204   |

Primary Examiner—Norman Yudkoff
Assistant Examiner—Hiram H. Bernstein
Attorney—Dressler, Goldsmith, Clement & Gordon ABSTRACT: Solid food products, for example, onions, apples, strawberries and the like are dehydrated by immersion in a hydrocarbon liquid having a normal boiling point between about 60° C. and 140° C. distilling the liquid together with moisture in the food at a temperature between about 20° C. and about 75° C. while leaving said food wet with said hydrocarbon liquid and thereafter extracting said wet food with a second highly volatile water-immiscible organic liquid having a boiling point between about −50° C. and about 30° C. and volatilizing said second liquid off until all traces of said hydrocarbon liquid are removed.

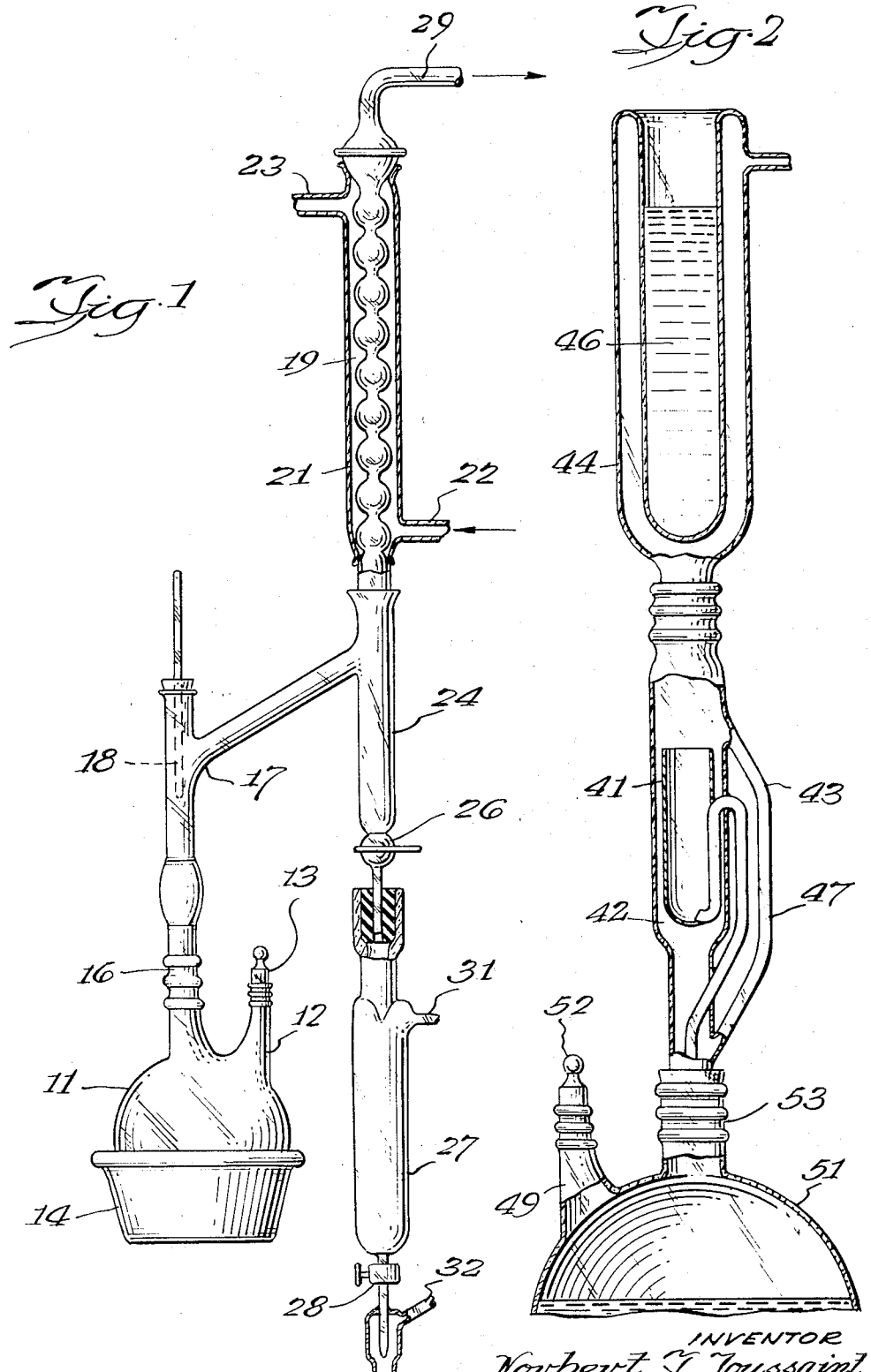

3,628,967

TWO-STAGE SOLVENT DRYING OF FOODS

SUMMARY OF THE INVENTION

This invention relates to the drying of food and, more particularly, to the conversion of food to be dehydrated by distillation of water in the presence of a solvent followed by removal of said solvent by treatment with a second highly volatile solvent.

It is now well known to convert food to dehydrated form by removal of water therefrom. A wide variety of dried food products may be purchased, including meats, fruits and vegetables. For the most part, these products are dried by evaporating water, under the influence of heat, vacuum, or both. Processing conditions are carefully chosen so that quality is preserved as much as possible, and fairly good products are obtained. However, considerable caution must be exercised in selecting processing conditions because of a risk that the food will be charred, overdried or otherwise damaged so that it is unpalatable, and, if recombined with water, will lack desirable freshness or crispness.

In application Ser. No. 435,456, filed Feb. 26. 1965, by Norbert F. Toussaint and Jeanne Toussaint, now abandoned, there is disclosed a method of dehydrating foods wherein the food is immersed in a water-immiscible liquid and the liquid is distilled off, preferably at a temperature between about 50° C. and about 70° C. The method of said application produces excellent dried products which retain full flavor on rehydration. However, the treatment of large amounts of food products by said method requires large surfaces so that the food may be spread out thinly for removal of the last vestiges of solvents without the excessive distillation times or temperatures which would be detrimental to flavor retention.

In accordance with the present invention, there is provided a process comprising immersing the food product containing removable water in a hydrocarbon liquid which boils between about 60° C. and about 140° C. at atmospheric pressure, distilling said hydrocarbon liquid together with water at a temperature between about 20° C. and about 75° C. until substantially all of said removable water has distilled off, thereafter removing excess hydrocarbon liquid from said food while retaining sufficient hydrocarbon liquid to wet said food, and thereafter extracting said hydrocarbon liquid-wetted food with a second organic water-immiscible liquid boiling between about −50° C. and about 30° C. until all traces of the first solvent are removed.

DESCRIPTION OF THE DRAWINGS

Apparatus suitable for carrying out the process of this invention is illustrated in the accompanying figures of which:

FIG. 1 shows a cross-sectional elevation of an apparatus suitable for the first distillation step of the process, and FIG. 2 shows a cross-sectional elevation of an apparatus suitable for the second liquid treatment step of the process.

In FIG. 1, food and hydrocarbon liquid are charged to two-necked flask 11 through one neck 12 which is thereafter sealed with stopper 13. Heating element 14 brings the flask to the desired distillation temperature. Hydrocarbon vapors pass through neck 16 and 17 past thermometer 18 and into condenser 19 which has a cooling jacket 21 through which ice water is circulated from a pump (not shown) to inlet 22 and from outlet 23 back to the pump.

Hydrocarbon and water vapors condensed in condenser 19 drop into trap 24 in which separation takes place because of the higher density of the water. Water is drawn off through stopcock 26 into trap 27 and finally through stopcock 28 to discard. After the condensed hydrocarbon liquid fills the trap 24, excess liquid spills back into the flask 11 through tube 17 so that the distillation can continue until all of the removable water has been distilled over.

When the hydrocarbon liquid used is one which has a normal boiling point higher than the desired distillation temperature, reduced pressure must be applied to the system; and for this purpose, tube 29 leading from the condenser, and tubes 31 and 32 lead to a source of suction (not shown).

After completion of the distillation of the removable water (as indicated by the fact that the fresh condensate contains no water), the hydrocarbon liquid is drawn from trap 24 to stop the return flow of condensate through tube 17 and the distillation of the hydrocarbon liquid is carried forward until all excess is removed from the food in flask 11, although the food is still wet with the liquid.

At this stage, the wet food product is removed from the flask 11 of the apparatus of FIG. 1 and placed into extracting thimble 41 of a Soxhlet extractor 42 of the apparatus of FIG. 2 for treatment with a highly volatile, water-immiscible second liquid, such as a liquid having a normal boiling point between about −50° C. and 30° C.

The volatile liquid is charged through neck 49 into flask 51; and stopper 52 is then reinserted to seal the flask. In some cases, the volatile liquid will be charged in vapor form and will then condense and drop back into the flask as hereinafter described. Under ambient conditions, boiling will commence at once in most volatile liquids boiling within the above-specified range. For some solvents boiling at the upper end of the above-specified range, a slight heating may be required; and for those boiling at the lower end of the range cooling and/or superatmospheric pressure may be used for better control.

Vapors of the highly volatile liquid pass through neck 53 into Soxhlet extractor 41 through tube 43 and then into jacket 44 of condenser 46. The inner chamber of the condenser is filled with a very cold liquid such as a dry ice trichloroethylene mixture and the vapors in the condenser jacket condense therein dropping back into the Soxhlet extractor 42. As the level of condensed liquid rises in the Soxhlet extractor, it immerses the food product within the filtering thimble and eventually rises to the level of the U-shaped bend at the top of tube 47, causing the siphoning of condensed liquid back into the flask for repetition of the cycle as many times as desired.

The number of cycles of treatment with the highly volatile liquid to achieve complete removal of the hydrocarbon liquid from within the pores of the food product will, of course, vary with the nature of the food product, the nature of the hydrocarbon liquid and the nature of the highly volatile liquid. For some systems a single cycle may be sufficient, but it is generally preferred to use at least five cycles.

Numerous modifications of the specific procedure discussed above may be used, as will be apparent to those skilled in the art. For example, the excess hydrocarbon liquid after the distillation of removable water may be removed by filtration or decantation rather than by continuing the distillation. Or if desired, a portion of the hydrocarbon liquid which wets the food product may be removed in a vacuum oven prior to treatment with the highly volatile liquid. It may also be advantageous in some cases to retain the food product within a Soxhlet thimble during the distillation step for ease of removal and for direct transfer to the extraction step.

After treatment with the highly volatile liquid, it may be desirable, particularly with liquids having boiling points at the upper end of the acceptable range, to subject the food product to the final drying step of short duration (e.g., about 5 minutes) to remove all taste of the volatile solvent.

Suitable hydrocarbon liquids include the paraffins and cycloparaffins having from six to eight carbon atoms and aromatic compounds, such as benzene and toluene. The preferred hydrocarbon liquids are n-hexane, n-heptane, isoheptane and mixtures containing two or more of these materials.

As stated above, it is preferred to carry out the distillation step at reduced pressures when the hydrocarbon liquid is one which boils near the upper end of the acceptable range. A suitable pressure for distillation with n-heptane is about 200 mm. of mercury, at which pressure the liquid boils at 58.5° C.; and a suitable pressure or distillation with n-octane is about 50 mm. of mercury, at which pressure the liquid boils at 50.6° C.

Suitable highly volatile liquids include low-boiling paraffins, and specifically propane, n-butane, isobutane, and mixtures thereof; and low boiling fluoroparaffins and chlorofluoroparaffins such as dichlorodifluoromethane, 1,1-difluoroethane, 1-chloro-1,1-difluoroethane, symmetrical dichlorotetrafluoroethane and mixtures thereof.

The process of this invention is generally applicable to food products which are naturally small in size (e.g., berries) or which may be cut into pieces. Typical food products include strawberries, raspberries, lemons, limes, oranges, tomatoes, apples, mushrooms, onions and ground beef.

EXAMPLE 1

50 grams of cut strawberries were charged to a round bottom (200 ml.) two-necked flask with 100 mm. of n-hexane and refluxed for 4 hours, the water separating in the trap. The strawberry pulp was then placed in a vacuum oven for 20 minutes at 40° C. to remove a portion of the liquid hexane. Some of the partially dried food was placed in a Soxhlet thimble and extracted with symmetrical dichlorotetrafluoroethane under a dry ice trichloroethylene condenser at atmospheric pressure for about an hour (or for about 30 cycles of treatment). The product was placed in a vacuum oven for about 5 minutes to remove all taste of the dichlorofluoroethane. The product was a thoroughly dried product of good appearance and had the full taste of fresh strawberries without any trace of a foreign taste.

EXAMPLE 2

Another portion of the hexane-wetted product of example 1 removed from the vacuum oven was placed in another Soxhlet thimble and extracted with dichlorodifluoromethane following the procedure of example 1. The product was similar to that of example 1.

EXAMPLE 3

Another portion of the hexane-wetted product of example 1 removed from the vacuum oven was placed in another Soxhlet thimble and extracted with isobutane following the procedure of example 1. The product was similar to that of example 1.

EXAMPLE 4

Example 1 was repeated, except that the food treated was 50 grams of diced onions and that the vacuum oven treatment to remove liquid hexane was omitted. The product was a natural colored (undarkened) product of good appearance having the full flavor of fresh onion without any trace of foreign taste.

The invention has been described with reference to certain specific embodiments; but it will be understood that various changes may be made in the apparatus used and the method of operation without departing from the invention as defined in the appended claims.

I claim:

1. A method of converting food containing removable water to the dehydrated state which comprises immersing said food in a hydrocarbon liquid boiling between about 60° C. and about 140° C. at atmospheric pressure, distilling said hydrocarbon liquid together with water at a temperature between about 20° C. and about 75° C. until substantially all of said removable water has distilled off, thereafter removing excess hydrocarbon liquid from said food while retaining sufficient hydrocarbon liquid to wet said food, and thereafter extracting said hydrocarbon liquid-wetted food with a second organic water-immiscible liquid of the class consisting of paraffins, fluoroparaffins and chlorofluoroparaffins boiling between about −50° C. and about 30° C. until all traces of said hydrocarbon liquid are removed.

2. The method of claim 1 wherein said hydrocarbon is a member of the class of paraffins and cycloparaffins.

3. The method of claim 2 wherein said hydrocarbon liquid comprises at least one hexane.

4. The method of claim 2 wherein said hydrocarbon liquid comprises at least one heptane and said first distillation step is carried out at subatmospheric pressure.

5. The method of claim 2 wherein said hydrocarbon liquid comprises at least one octane and said first distillation step is carried out at subatmospheric pressure.

6. The method of claim 1 wherein said second organic liquid comprises isobutane.

7. The method of claim 1 wherein said second organic liquid comprises symmetrical dichlorotetrafluoroethane.

8. The method of claim 1 wherein treatment with said second liquid extraction step is repeated through at least five cycles of organic liquid addition and removal.

* * * * *